United States Patent
Bristol et al.

(10) Patent No.: US 7,033,134 B2
(45) Date of Patent: Apr. 25, 2006

(54) AIR TURBINE STARTER HAVING A FORCE BALANCED, PRESSURE ENERGIZED, WEIGHTED CHECK VALVE

(75) Inventors: Brent L. Bristol, Phoenix, AZ (US); Louie T. Gaines, Phoenix, AZ (US); William A. Facinelli, Phoenix, AZ (US); David M. Mathis, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 135 days.

(21) Appl. No.: 10/786,374

(22) Filed: Feb. 24, 2004

(65) Prior Publication Data

US 2005/0186067 A1     Aug. 25, 2005

(51) Int. Cl.
*F01D 25/18*    (2006.01)
*F16K 15/00*    (2006.01)

(52) U.S. Cl. .................. 415/110; 137/466; 137/519.5
(58) Field of Classification Search ............... 137/466, 137/519.5; 415/110
See application file for complete search history.

(56) References Cited

U.S. PATENT DOCUMENTS

| | | | |
|---|---|---|---|
| 387,961 A | 8/1888 | Ryan | |
| 530,442 A | 12/1894 | Munger | |
| 719,654 A | 2/1903 | Ewing, Jr. | |
| 1,536,127 A | 5/1925 | Newton | |
| 1,897,492 A * | 2/1933 | Ledoux | ..................... 137/433 |
| 2,372,456 A | 3/1945 | Stewart | |
| 3,036,592 A | 5/1962 | Lips | |
| 3,085,591 A | 4/1963 | Schneider | |
| 3,170,292 A | 2/1965 | Howes et al. | |
| 3,245,669 A | 4/1966 | Huggins et al. | |
| 3,457,948 A | 7/1969 | Niedemayer | |
| 3,472,024 A | 10/1969 | Strub et al. | |
| 3,811,470 A | 5/1974 | Schaefer | |
| 3,924,708 A | 12/1975 | Dabrowka | |
| 3,941,145 A | 3/1976 | Morain et al. | |
| 4,046,222 A | 9/1977 | Skrivanek et al. | |
| 4,077,202 A | 3/1978 | Schutze | |
| 4,100,935 A | 7/1978 | Harnish | |
| 4,383,549 A | 5/1983 | Maldavs | |
| 4,525,995 A | 7/1985 | Clark | |
| 4,605,039 A | 8/1986 | Johnson et al. | |
| 4,638,835 A | 1/1987 | Chuang | |
| 4,779,413 A | 10/1988 | Mouton | |
| 4,825,897 A | 5/1989 | Shade | |
| 4,944,327 A | 7/1990 | Gyben | |
| 4,960,085 A | 10/1990 | Coons | |
| 4,986,310 A * | 1/1991 | Bailey et al. | ................ 137/859 |

(Continued)

*Primary Examiner*—Edward K. Look
*Assistant Examiner*—Richard A. Edgar
(74) *Attorney, Agent, or Firm*—Ingrassia Fisher & Lorenz

(57) ABSTRACT

An air turbine starter is provided that includes a check valve assembly for placement between a first environment, at least a portion of which is at a first pressure ($P_1$), and a second environment, at least a portion of which is at a second pressure ($P_2$), wherein the difference between the first and second pressures generate a pressure force ($F_p$). The check valve assembly comprises a valve element disposed between the valve seat and the valve body, the valve element capable of being acted upon by a gravitational force ($F_w$), a viscous force of the fluid to be communicated between the gearbox assembly and the starter housing ($F_v$), a buoyancy force of the valve element ($F_b$), and the pressure force on the valve element ($F_p$), the valve element further configured to translate axially to a closed position when $P_2 < P_1$ and $F_w < F_v + F_b + F_p$.

26 Claims, 5 Drawing Sheets

U.S. PATENT DOCUMENTS

| | | |
|---|---|---|
| 5,042,963 A | 8/1991 | Sorenson et al. |
| 5,235,812 A | 8/1993 | Klaass et al. |
| 5,249,597 A | 10/1993 | Thomas |
| 5,462,081 A | 10/1995 | Perusek et al. |
| 5,636,848 A | 6/1997 | Hager et al. |
| 5,911,678 A | 6/1999 | White |
| 5,941,532 A | 8/1999 | Flaherty et al. |
| 5,979,488 A | 11/1999 | Smith et al. |
| 6,004,037 A | 12/1999 | Harris et al. |
| 6,263,912 B1 | 7/2001 | Brown et al. |
| 6,378,293 B1 | 4/2002 | Care et al. |
| 6,681,579 B1 * | 1/2004 | Lane et al. ............ 60/787 |
| 2003/0059294 A1 | 3/2003 | Olsen |
| 2003/0145602 A1 | 8/2003 | Lane et al. |

* cited by examiner

AIR TURBINE STARTER HAVING A FORCE BALANCED, PRESSURE ENERGIZED, WEIGHTED CHECK VALVE

CROSS-REFERENCE TO RELATED APPLICATIONS

The present application is related to U.S. patent application Ser. No. 10/732,935, entitled AIR TURBINE STARTER HAVING A LOW DIFFERENTIAL CHECK VALVE, filed Dec. 10, 2003, which is assigned to the Assignee of the present application.

FIELD OF THE INVENTION

The present invention relates to an air turbine starter, and more particularly, an air turbine starter having a force balanced, pressure energized, weighted check valve.

BACKGROUND OF THE INVENTION

An air turbine starter (ATS) is typically used to start an aircraft turbine engine, for example, a gas turbine jet engine. The ATS is typically mounted to the jet engine through a gearbox or other transmission assembly and a cover plate or wall is located between the starter and gearbox housings. The gearbox transfers power from the ATS to the engine to start the engine.

Many air turbine starters typically include lubrication to run properly. Some air turbine starters use an assisted wet cavity design (AWC) to assist in lubrication. These designs include a turbine starter housing having a mounting face or mounting flange that is sealingly engaged with, and coupled to, the gearbox such that a porting system, that allows free transfer of lubricating oil between the gearbox and the starter, is defined. Each port in the porting system is typically in fluid communication with passages within the starter housing so that oil can be distributed within the starter, and are located in portions of the starter-gearbox assembly such that they act as sump passages or oil return passages.

Typically in AWC designs, air flows freely between the starter and the gearbox. The gearbox may be pressurized or nonpressurized. In a non-pressurized gearbox design, the gearbox pressure may be about 0.1–0.3 psi above ambient pressure. At times, the starter housing may become punctured, causing a breach in the starter structure and a change in pressure. In such case, the starter pressure may drop to equalize with ambient pressure. Consequently, in the case of the non-pressurized design, the pressure differential between the gearbox and starter may be about 0.1 to 0.3 psi. Though this pressure differential may be relatively small, excessive oil may still leak from the gearbox to the starter and, consequently, out through the breach. Generally, in such an event, a check or reed valve is used to counteract the oil loss. However, because the pressure differential between the starter and gearbox is small, it has been found that these valve types may not work consistently.

Accordingly, there is a need for an aircraft turbine starter with improved fluid flow control in the condition of starter housing puncture. Additionally, there is a need for an air turbine starter with the ability to operate during starter housing breach, and in particular, in instances when the breach causes a low pressure differential between the starter and gearbox. Furthermore, other desirable features and characteristics of the present invention will become apparent from the subsequent detailed description of the invention and the appended claims, taken in conjunction with the accompanying drawings and this background of the invention.

SUMMARY OF THE INVENTION

The present invention provides an air turbine starter including a starter housing and a check valve. The starter housing is adapted to couple to a gearbox assembly, and includes an opening configured to provide fluid communication between the gearbox assembly and the starter housing, wherein at least a portion of the gearbox assembly is at a pressure of $P_1$ and at least a portion of the starter housing is at a pressure of $P_2$, thereby generative a pressure force ($F_p$) therebetween. The check valve assembly is disposed within the opening and comprises a valve body, a valve seat, and a valve element. The valve body has an inlet port, an outlet port, and a flow passage therebetween. The valve seat is adjacent the valve body and has an opening therethrough. The valve seat opening is in fluid communication with the valve body flow passage. The valve element is disposed between the valve seat and the valve body, and is capable of being acted upon by a gravitational force ($F_w$), a viscous force of the fluid to be communicated between the gearbox assembly and the starter housing ($F_v$), a buoyancy force of the valve element ($F_b$), and the pressure force on the valve element ($F_p$). The valve element is further configured to translate axially to a closed position when $P_2 < P_1$ and $F_w < F_v + F_b + F_p$.

In another embodiment, and by way of example only, a check valve assembly is provided for placement between a first environment, at least a portion of which is at a first pressure ($P_1$), and a second environment, at least a portion of which is at a second pressure ($P_2$), wherein the difference between the first and second pressures generate a pressure force ($F_p$). The check valve assembly comprises a valve body, valve seat, and valve element. The valve body has an inlet port, an outlet port, and a flow passage therebetween. The valve seat is adjacent to the valve body and has an opening therethrough. The valve seat opening is in fluid communication with the valve body flow passage. The valve element is disposed between the valve seat and the valve body, and is capable of being acted upon by a gravitational force ($F_w$), a viscous force of the fluid to be communicated between the gearbox assembly and the starter housing ($F_v$), a buoyancy force of the valve element ($F_b$), and the pressure force on the valve element ($F_p$). The valve element is further configured to translate axially to a closed position when $P_2 < P_1$ and $F_w < F_v + F_b + F_p$.

In yet another embodiment, a check valve assembly is provided for placement between a first environment, at least a portion of which is at a first pressure ($P_1$), and a second environment, at least a portion of which is at a second pressure ($P_2$), wherein the difference between the first and second pressures generate a pressure force ($F_p$). The check valve assembly comprises a backing plate, a cage, a protrusion, a valve seat, and a valve element. The backing plate has an inlet port, an outlet port, and a flow passage extending therebetween. The cage is coupled to the backing plate, and at least one portion of the cage extends across the flow passage. The protrusion extends from a surface of the at least one portion of the cage and is configured to selectively contact the valve element. The valve seat is adjacent to the cage and has an opening therethrough. The valve seat opening is in fluid communication with the valve body flow passage. The valve element is disposed between the valve seat and the valve body. The valve element is capable of being acted upon by a gravitational force ($F_w$), a viscous force of the fluid to be communicated between the gearbox assembly and the starter housing ($F_v$), a buoyancy force of the valve element ($F_b$), and the pressure force on the valve element ($F_p$). The valve element is further configured to translate axially to a closed position when $P_2<P_1$ and $F_w<F_v+F_b+F_p$.

Other independent features and advantages of the preferred air turbine starter will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in a turbine starter, it should be appreciated that it can be implemented in numerous other machines including, but not limited to, a gas turbine engine, a hydraulic pump, a water pump, or various other chemical and industrial pumps.

Figure 1:
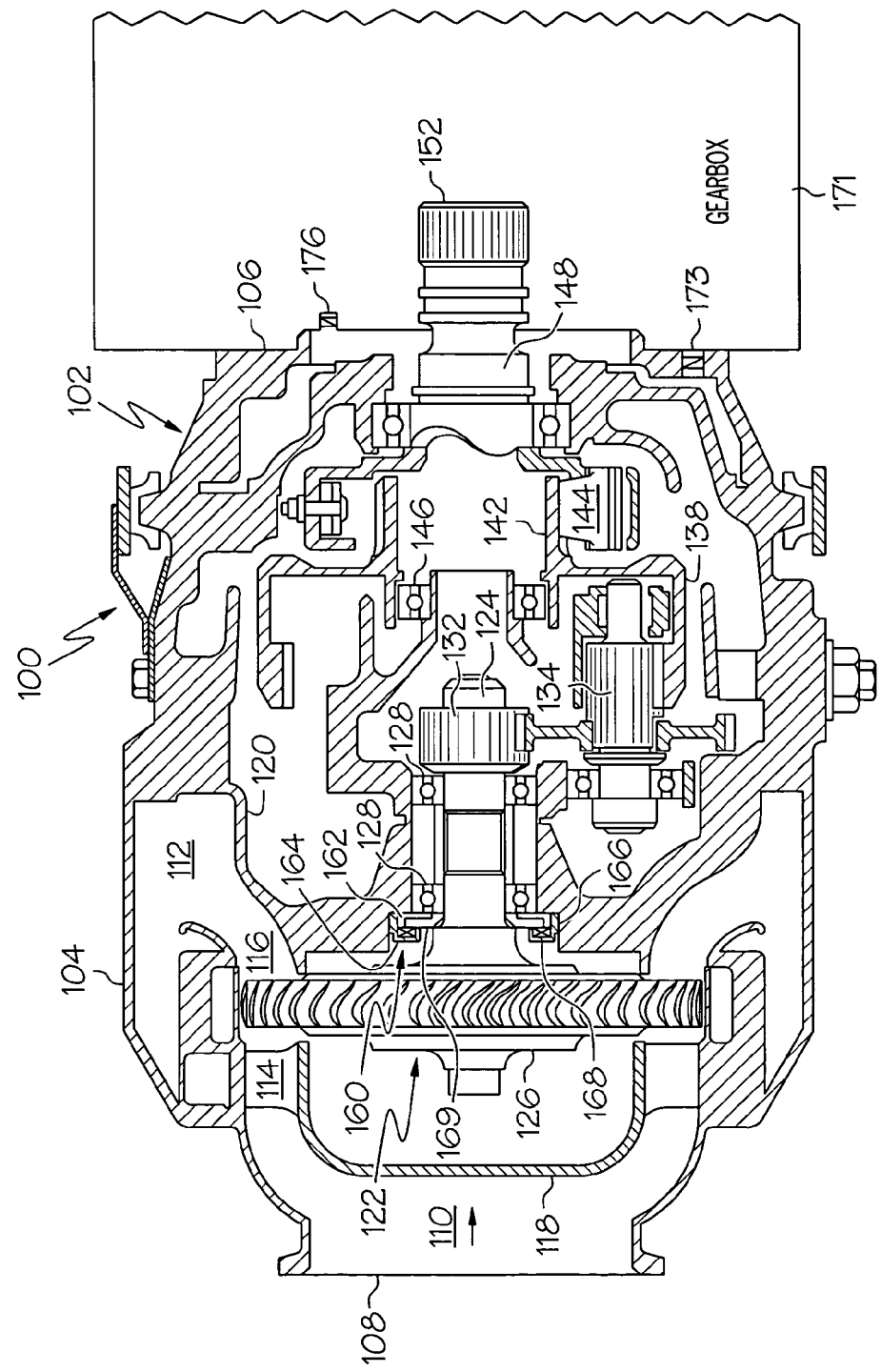
FIG. 1 is a cross sectional view of an air turbine starter (ATS) having an exemplary embodiment of the check valve assembly coupled thereto.

Turning now to the description, a cross sectional view of an exemplary air turbine starter (ATS) that is used to initiate the rotation of a larger turbine, such as a turbofan jet engine, is depicted in FIG. 1. An exemplary check valve assembly 176 is shown coupled thereto. The ATS 100 is enclosed within a housing assembly 102 that includes at least a turbine section 104 and an output section 106. The housing assembly 102 may be made up of two or more parts that are combined together or may be integrally formed as a single piece. The housing assembly 102 includes an inlet plenum 108, which directs compressed air into the housing assembly 102. The compressed air received at the plenum 108 flows through an annular flow channel 110 and out a radial outlet port 112. The annular flow channel 110 includes an axial flow portion 114 and a substantially curved radial flow portion 116. The axial flow portion 114 is formed through a stator assembly 118 that is mounted within the housing assembly turbine section 104 proximate the inlet plenum 108. The radial flow portion 116, which flares the annular flow channel 110 radially outwardly, is formed between a portion of the housing assembly turbine section 104 and an exhaust housing 120 that is mounted within the housing assembly 102.

A turbine wheel 122 is rotationally mounted within the housing assembly turbine section 104. In particular, the turbine wheel 122 has an output shaft 124 that extends from a hub 126, through the exhaust housing 120, and into the housing assembly output section 106. The turbine wheel output shaft 124 is rotationally mounted in the housing assembly output section 106 by bearing assemblies 128. A gear 132 is coupled to the turbine wheel output shaft 124, and meshes with a compound planetary gear train 134. The compound planetary gear train 134 engages a ring gear 138 and a hub gear 142, which is in turn coupled to an overrunning clutch 144. During operation of the ATS 100, this gearing configuration converts the high speed, low torque output of the turbine wheel output shaft 124 into low speed, high torque input for the overrunning clutch 144.

The overrunning clutch 144, as noted above, is coupled to the hub gear 142, which is supported by another bearing assembly 146. A drive shaft 148 extends from the overrunning clutch 144, through the turbine housing output section 106, and is coupled to a turbine output shaft 152. The output shaft 152 is, in turn, coupled to the turbofan jet engine gearbox 171.

The gearbox 171 typically includes a plurality of passages (not shown) through which oil freely passes to supply lubrication to the gearbox 171 components. The passages are in fluid communication with oil flow passages within the turbine housing assembly output section 106 via openings 174 (shown in FIG. 2). Preferably, the check valve assembly 176 is placed adjacent or within an opening 174 formed within the starter housing 102. In this embodiment, the check valve assembly 176 is adjacent to the opening 174. The check valve assembly 176 operates according to a pressure differential existing between the interior portion of the gearbox 171 and the interior of the ATS 100. Thus, the openings 174 are selectively opened or closed by a check valve assembly 176 depending on the pressure differential.

Turning back to FIG. 1, lubricating oil is sealed within the ATS assembly 100 via a face seal assembly 160. Specifically, the face seal assembly 160 provides a fluid tight seal between the rotating turbine wheel 122 and the oil held inside of the housing assembly turbine section 104 and the housing assembly output section 106. The face seal assembly 160 includes a rotor 162, and a stator seal assembly 164 that includes a seal case 166 and a seal stator ring 168. The rotor 162 is mounted on the turbine wheel output shaft 124, and has an axially facing flange 169 that extends radially outwardly away from the turbine wheel output shaft 124. The seal case 166 is mounted to the exhaust housing 120 and surrounds the turbine wheel output shaft 124. The seal stator ring 168 is housed within the seal case 166 and sealingly engages the axially facing flange 169 of the rotor 162, providing the fluid tight seal between the rotating turbine wheel output shaft 124 and the oil held inside of the turbine housing 104 and output 106 sections. Though not explicitly depicted, it should be appreciated that another face seal assembly 160 may also be included in the ATS 100 that seals the turbine output shaft 152.

Figure 2:
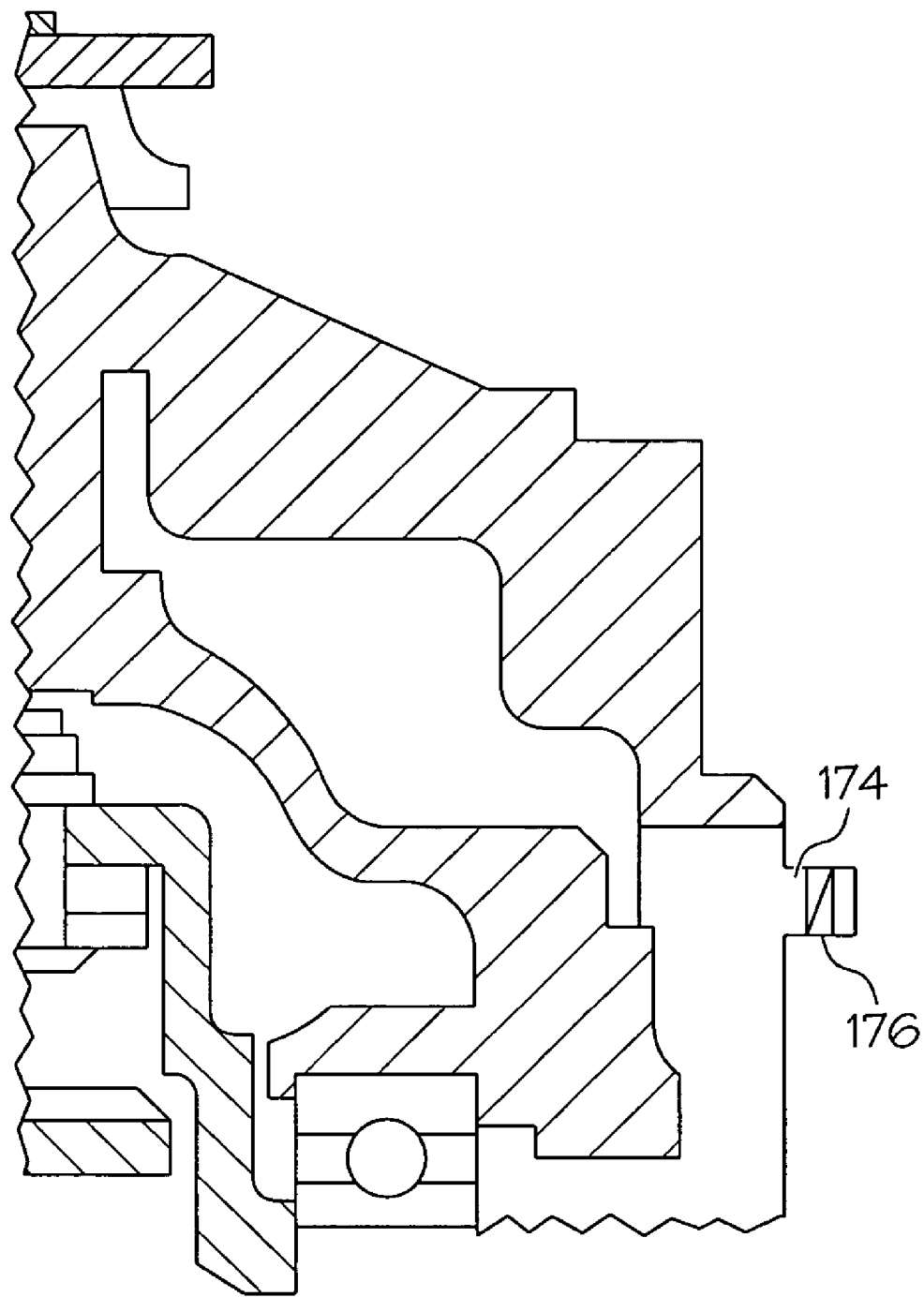
FIG. 2 is a detail and cutaway view of a portion of the air turbine starter of FIG. 1 including an exemplary embodiment of the check valve assembly.

FIG. 2 illustrates a detail and cutaway view of a portion of the starter 100 of FIG. 1 including a check valve assembly 176 according to an exemplary embodiment. The opening 174 extends between the ATS 100 and the gearbox 171 and, as mentioned previously, allows the ATS 100 to be serviced with lubricating oil from gearbox 171. The opening 174 is generally configured to receive the check valve assembly 176 such as through threaded engagement, bayonet mount or other mounting methods. Alternatively, the opening 174 can be configured to close around and accept the check valve assembly 176. The opening 174 is shown to be positioned towards the outer periphery of the ATS housing 102; however, as will be appreciated by those skilled in the art, the openings can be located at any position to allow fluid communication between the ATS 100 and the gearbox 171. For instance, the ATS housing 102 may include additional walls or cover plates that may cover certain ATS components within which openings may be formed. Thus, the check valve assembly 176 can be placed in or over a wall or cover plate opening that may be mounted on the ATS housing 102. Moreover, although the illustration depicts one opening 174, more than one opening 174 between the ATS 100 and gearbox 171 may be employed. In the case of more than one opening 174, either the same number of check valve assemblies 173 or a check valve assembly used in conjunction with other valve assemblies will typically be employed.

Figure 3:
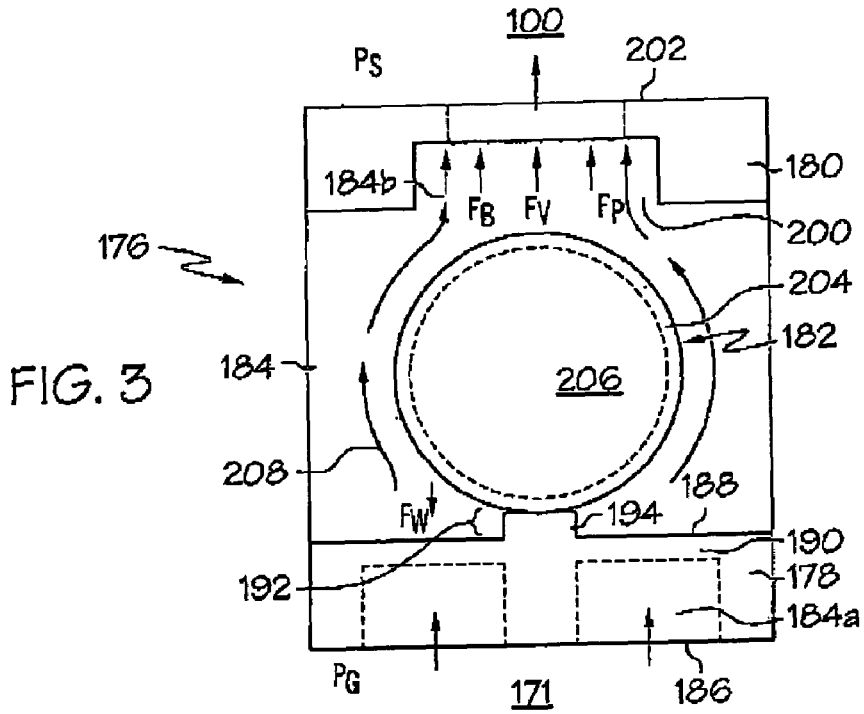
FIG. 3 is a cross section view of the portion of the starter housing including an exemplary embodiment of the check valve assembly under normal operating conditions.
Figure 4:
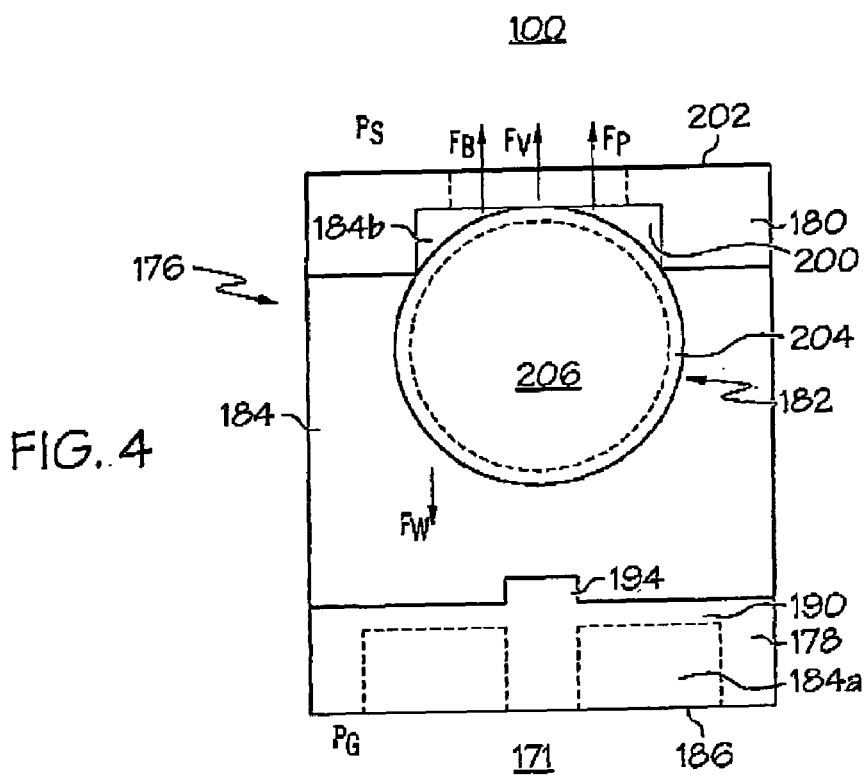
FIG. 4 is a detailed cross section view of the portion of the starter housing including an exemplary embodiment of the check valve assembly under an ATS breach condition.
Figure 5:
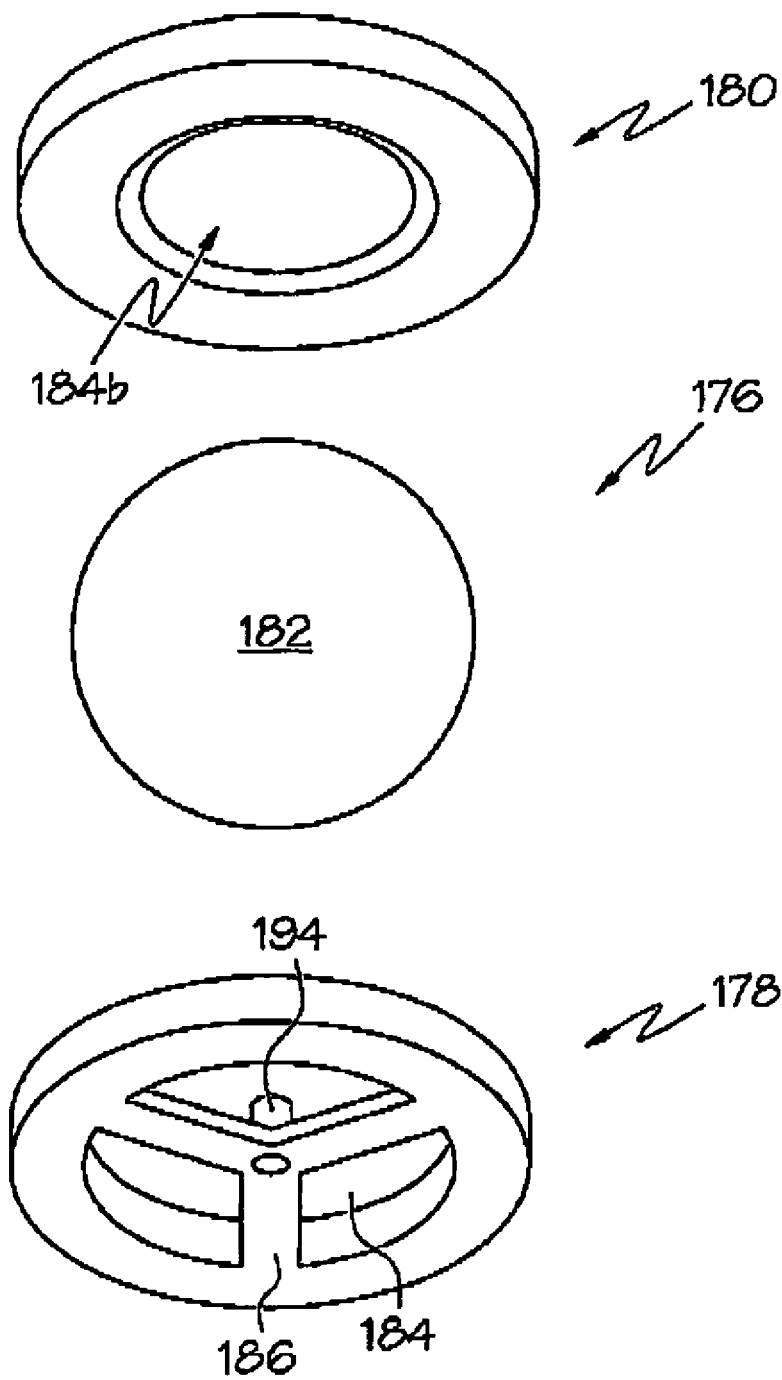
FIG. 5 is an exploded view of the check valve assembly according to an exemplary embodiment.

Turning to FIGS. 3–5, detailed, close up views of the check valve assembly 176 are provided. FIGS. 3 and 4 illustrate the valve assembly 176. FIG. 5 is an exploded view of the valve assembly 176 illustrated in FIGS. 3 and 4. The check valve assembly 176 is normally open under normal operating conditions for the ATS 100 and the gearbox 171.

The check valve assembly 176 includes a valve body 178, a valve seat 180, and a valve element 182. The valve body 178 and valve seat 180 are sufficiently spaced apart so that the valve element 182 is trapped therebetween and is capable of axially translating between an open and closed position in response to a pressure differential that may be present between the ATS 100 and the gearbox 171. Each of the valve assembly 176 components will now be discussed.

The valve body 178 and valve seat 180 are configured to be disposed within the opening 174 between the ATS 100 and the gearbox 171, and each includes through channels 184a, 184b that each comprise part of a flow passage 184 allowing fluid communication between the ATS 100 and gearbox 171 oil passages. Thus, the valve body 178 and valve seat 180 can be generally ring-shaped.

The valve body 178 has an inlet 186, an outlet 188 and a channel 184a therebetween. The valve body 178 also preferably has a cage 190 formed thereon that is at least partially disposed within the channel 184a. The cage 190 is configured to selectively contact the valve element 182 during a valve open position and preferably has a tri-spoke configuration that extends across the flow passage 184. It will be appreciated that this is merely exemplary and that instead of a spoke configuration, the cage 190 can be, for instance, a lattice-structure, cross-structure or any other configuration able to position the valve element 182 between cage 190 and the valve seat 180.

Preferably, a clearance 192 is provided between the cage 190 and the valve element 182. To this end, a stop protrusion 194 that extends from the center of the cage 190 into the flow passage 184 is provided to limit the distance of axial translation of the valve element 182. The stop protrusion 194 can be formed on or fixed to the cage 190. The protrusion 194 is preferably adjustable so that the clearance 192 between the cage 190 and valve element 182 can be adjusted.

Most preferably, the valve body 178 is positioned proximate the valve seat 180 such that the valve element 182 axially translates along the passage within which the valve assembly 176 is disposed. However, the valve body 178 can optionally be configured to couple to the valve seat 180. In such an embodiment, the valve body 178 includes a peripheral flange configured to couple to a corresponding portion of the valve seat 180 and the valve element 182 is disposed therein.

Figure 6:
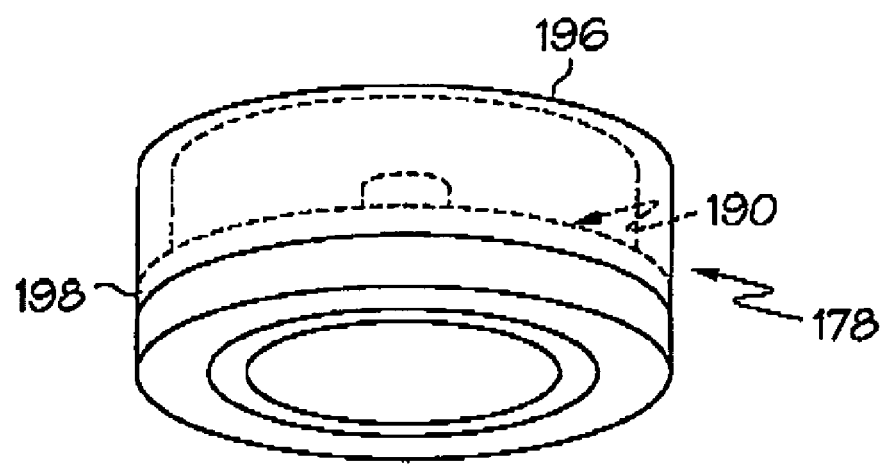
FIG. 6 is an exemplary valve body that may be implemented into the check valve assembly depicted in FIG. 5.

In another embodiment such as shown in FIG. 6, the valve body 178 is a two-piece assembly that includes a backing plate 198 upon which the cage 190 is coupled. The backing plate 198 further includes an outer peripheral flange configured to couple to the valve seat 180.

Figure 7:
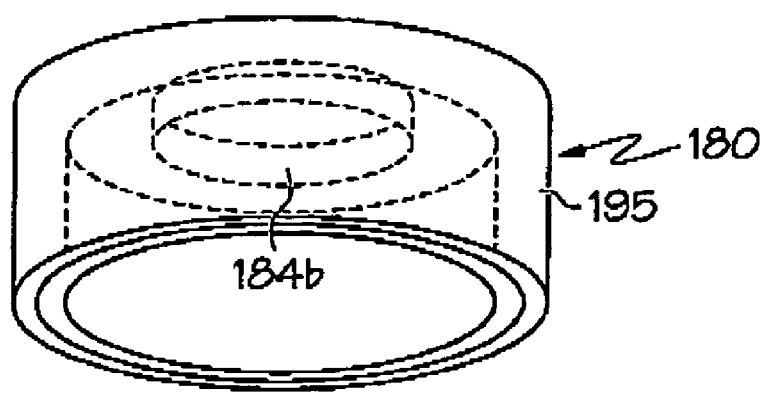
FIG. 7 is an exemplary valve seat that may be implemented into the check valve assembly depicted in FIG. 5.

Referring back to FIGS. 3 and 4, the valve seat 180 has an inlet port 200, an outlet port 202, and channel 184b therebetween. The valve seat inlet port 200 is configured to selectively contact the valve element 182 when the valve is in a closed position. To this end, the inlet port 200 is preferably configured to have a diameter that is smaller than the diameter of the valve element 182. As will be appreciated, the inlet port 200 is preferably circularly shaped, but as will be appreciated, it can be any one of numerous other shapes, depending on the overall configuration of the check valve assembly 176. Thus, in the event of a pressure differential, such as between about 0.1–0.3 psi, between the gearbox 171 and the starter 100 the valve element 182 can tightly seal against the valve seat 180. The valve seat 180 can be constructed of a chemically resistant elastomer or can be constructed to have a precision-machined or precision-ground surface. The outlet port 202 is preferably sized and dimensioned to allow a prescribed flow of oil past the valve element 182 and the valve seat 180 into the starter 100. Optionally, the valve seat 180 can have a sidewall 195 that elongates the channel 184b, as shown in FIG. 7, and is configured to couple with a corresponding portion of the valve body 178 and trap the valve element 182 therebetween.

The valve element 182 is configured to sealingly contact the inlet port 200, thus, the valve element 182 has a surface that can mate with the shape of the inlet port 200. As mentioned above, the shape of the inlet port 200 is preferably circular, accordingly, the shape of the valve element 182 is preferably an orb. Most preferably, the valve element 182 is configured such that the weight of the valve element ($F_w$) is greater than the sum of the opposing forces that act on the valve element 182 when the valve is in an open position, while the weight of the valve element is less than the sum of the opposing forces when the valve is in a closed position. In other words, it is preferable that the valve element 182 sink to contact the cage 190 when the pressures between the gearbox 171 and starter 100 are equal, and to sealingly contact the valve seat 178 when the pressures between the gearbox 171 and starter 100 are not equal. The opposing forces are the buoyant force ($F_b$) of the element while in the starter 100 or gearbox 171 fluid, the viscous force or drag ($F_v$) from the fluid flow across the valve element 182, and the pressure force ($F_p$), which is proportional to the pressure difference between the environment of the gearbox 171 and the starter 100 ($P_G$–$P_S$). The aforementioned characteristic can be represented by the following equations:

$$\text{Valve open: } F_w > F_b + F_v + F_p \qquad (1)$$

$$\text{Valve close: } F_w < F_b + F_v + F_p \qquad (2)$$

Thus, the valve element 182 can have one of numerous configurations, such as a solid mass, a hollow element, or an element enclosed within a shell, having the above characteristics. In one preferred embodiment, shown in FIGS. 3 and 4 the valve element 182 comprises an outer shell 204 and a mass 206, having a greater density than the outer shell 204, disposed therein. The outer shell 204 can be constructed of a chemically resistant, low density plastic, ceramic, metal, or other suitable material, while the mass 206 can comprise any denser material such as, for example, lead, aluminum, or copper.

Turning to FIG. 3, the check valve assembly 176 is shown while supplying fluid from the gearbox 171 to the starter 100 during normal operation. In this embodiment, normal operation refers to an instance during which the pressure differential between the ATS 100 and gearbox 171 environments is about 0 psi. In a time of normal operation, a pressure differential resulting from the head height of fluid over the inlet port 186 relative to the exhaust port 202 exists, and at least the valve body 178 and valve element 182 are immersed in fluid or oil present between the gearbox 171 and starter 100. Thus, the valve element 182 freely translates axially between the valve body 178 and valve seat 180. Oil and/or air passes through the valve body channel 184a and around the outer periphery of the valve element 182, as indicated by arrows 208. Consequently, oil and/or air passes between the ATS 100 and gearbox 171 with little to no restriction.

However, in the event of ATS 100 puncture, the check valve assembly 176 seals the flow passage 184, preferably completely, such that oil and/or air preferably does not pass between the ATS 100 and gearbox 171, as illustrated in FIG. 4. During starter housing 102 breach, typically, the pressure in the ATS 100 drops below the pressure within the gearbox 171. The pressure differential is generally low and can be, for example, about 0.1–0.3 psig. As a result, the force exerted on the portion of the valve element 182 closest to the valve body 178 becomes greater than the force of the weight of the valve element 182. When this occurs, the outer peripheral surface of the valve element 182 contacts the valve seat inlet port 200 and forms a leak-tight seal to prevent flow of oil and/or air through flow passage 184.

Thus, an aircraft turbine starter having improved fluid flow control in the condition of a starter housing puncture has been provided. Additionally, the air turbine starter provided includes the ability to operate during starter housing breach, and in particular, in instances when the breach causes a low pressure differential between the starter and gearbox.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A check valve assembly for placement between and for selectively providing fluid communication between a first environment, at least a portion of which is at a first pressure ($P_1$), and a second environment, at least a portion of which is at a second pressure ($P_2$), wherein the difference between the first and second pressures generate a pressure force ($F_p$), the check valve assembly comprising:
   a valve body having an inlet port, an outlet port, and a flow passage therebetween;
   a valve seat adjacent to the valve body and having an opening therethrough, the valve seat opening in fluid communication with the valve body flow passage; and
   a valve element disposed between the valve seat and the valve body and having a density that is greater than the density of the fluid to be communicated between the fist environment and the second environment, the valve element capable, of being acted upon by a gravitational force ($F_w$), a viscous force of the fluid to be communicated between the first environment and the second environment ($F_v$), a buoyancy force of the valve element ($F_b$), and the pressure force on the valve element ($F_{p1}$), the valve element further configured to translate axially to a closed position when $P_2<P_1$ and $F_w<F_v+F_b+F_p$.

2. The check valve assembly of claim 1, wherein the valve body comprises:
   a backing plate;
   a cage coupled to the backing plate, wherein at least one portion of the cage extends across the valve body flow passage; and
   a protrusion extending from a surface of the at least one portion of the cage configured to selectively contact the valve element.

3. The check valve assembly of claim 2, wherein the protrusion is adjustable between a first and a second position.

4. The check valve assembly of claim 1, wherein the valve element further comprises:
   a shell; and
   a mass disposed within the shell.

5. The check valve assembly of claim 4, wherein the shell comprises chemically resistant plastic.

6. The check valve assembly of claim 4, wherein the shell comprises low density plastic.

7. The check valve assembly of claim 4, wherein the mass has a density that is greater than the density of the shell.

8. The check valve assembly of claim 1, wherein the valve seat further comprises an elastomeric portion coupled thereto and configured to selectively contact the valve element.

9. The check valve assembly of claim 1, wherein the valve seat comprises an elastomeric material.

10. A check valve assembly for placement between and for selectively providing fluid communication between a first environment, at least a portion of which is at a first pressure ($P_1$), and a second environment, at least a portion of which is at a second pressure ($P_2$), wherein the difference between the first and second pressures generate a pressure force ($F_p$), the check valve assembly comprising:
   a backing plate having an inlet port, an outlet port, and a flow passage extending therebetween;
   a cage coupled to the backing plate, at least one portion of the cage extends across the flow passage;
   a protrusion extending from a surface of the at least one portion of the cage configured to selectively contact the valve element;
   a valve seat adjacent to the cage and having an opening therethrough, the valve seat opening in fluid communication with the valve body flow passage; and
   a valve element disposed between the valve seat and the valve body and having a density that is greater than the density of the fluid to be communicated between the first environment and the second environment, the valve element capable of being acted upon by a gravitational force ($F_w$), a viscous force of the fluid to be communicated between the first environment and the second environment ($F_v$), a buoyancy force of the valve element ($F_b$), and the pressure force on the valve element ($F_p$), the valve element further configured to translate axially to a closed position when $P_2<P_1$ and $F_w<F_v+F_b+F_p$.

11. The check valve assembly of claim 10, wherein the protrusion is adjustable between a first and a second position.

12. The check valve assembly of claim 10, wherein the valve element further comprises:
   a shell; and
   a mass disposed within the mass.

13. The check valve assembly of claim 12, wherein the shell comprises chemically resistant plastic.

14. The check valve assembly of claim 12, wherein the shell comprises low density plastic.

15. The check valve assembly of claim 12, wherein the mass has a density that is greater than the density of the shell.

16. The check valve assembly of claim 10, wherein the valve seat further comprises an elastomeric portion coupled thereto and configured to selectively contact the valve element.

17. The check valve assembly of claim 10, wherein the valve seat comprises an elastomeric material.

18. An air turbine starter, comprising:
   a starter housing adapted to couple to a gearbox assembly, the starter housing including an opening configured to provide fluid communication between the gearbox assembly and the starter housing, wherein at least a portion of the gearbox assembly is at a pressure of $P_1$ and at least a portion of the starter housing is at a pressure of $P_2$, thereby generating a pressure force ($F_p$) therebetween; and
   a check valve assembly disposed within the opening, the check valve assembly comprising:
      a valve body having an inlet port, an outlet port, and a flow passage therebetween;
      a valve seat adjacent the valve body and having an opening therethrough, the valve seat opening in fluid communication with the valve body flow passage; and
      a valve element disposed between the valve seat and the valve body and having a density that is greater than the density of the fluid to be communicated between the gearbox assembly and the starter housing, the valve element capable of being acted upon by a gravitational force ($F_w$), a viscous force of the fluid to be communicated between the gearbox assembly and the starter housing ($F_v$), a buoyancy force of the valve element ($F_b$), and the pressure force on the valve element ($F_p$), the valve element further configured to translate axially to a closed position when $P_2<P_1$ and $F_w<F_v+F_b+F_p$.

19. The air turbine starter of claim 18, wherein the valve body comprises:
   a backing plate;
   a cage coupled to the backing plate, wherein at least one portion of the cage extends across the valve body flow passage; and
   a protrusion extending from a surface of the at least one portion of the cage configured to selectively contact the valve element.

20. The air turbine starter of claim 19, wherein the protrusion is adjustable between a first and a second position.

21. The air turbine starter of claim 18, wherein the valve element further comprises:
   a shell; and
   a mass disposed within the shell.

22. The air turbine starter of claim 21, wherein the shell comprises chemically resistant plastic.

23. The air turbine starter of claim 21, wherein the shell comprises low density plastic.

24. The air turbine starter of claim 21, wherein the mass has a density that is greater than the density of the shell.

25. The air turbine starter of claim 18, wherein the valve seat further comprises an elastomeric portion coupled thereto and configured to selectively contact the valve element.

26. The air turbine starter of claim 18, wherein the valve seat comprises an elastomeric material.

* * * * *

UNITED STATES PATENT AND TRADEMARK OFFICE
CERTIFICATE OF CORRECTION

PATENT NO.         : 7,033,134 B2
APPLICATION NO. : 10/786374
DATED              : April 25, 2006
INVENTOR(S)        : Brent L. Bristol et al.

It is certified that error appears in the above-identified patent and that said Letters Patent is hereby corrected as shown below:

In Column 8, Line 13, delete "(Fp1)" and insert --(Fp)--

Signed and Sealed this

Twenty-third Day of October, 2007

JON W. DUDAS
*Director of the United States Patent and Trademark Office*